United States Patent [19]

Spittle

[11] Patent Number: 5,779,782
[45] Date of Patent: Jul. 14, 1998

[54] MECHANICALLY BONDED FIBER MULCH AND PROCESS FOR PRODUCING SAME

[76] Inventor: Kevin Scott Spittle, 7934 Ravenwood La., Stanley, N.C. 28164

[21] Appl. No.: 663,033

[22] Filed: Jun. 7, 1996

[51] Int. Cl.$^6$ .................................................. C09K 17/00
[52] U.S. Cl. ........................ 106/164.3; 106/164.01; 106/200.1; 106/217.6; 106/287.25; 521/905; 523/132; 524/13; 524/14; 524/35; 47/9
[58] Field of Search ................ 106/287.25, 287.3, 106/164.01, 164.3, 200.1, 217.6; 47/9, 56; 521/905; 523/132; 524/13, 14, 35

[56] References Cited

U.S. PATENT DOCUMENTS

| | | | |
|---|---|---|---|
| 3,973,355 | 8/1976 | McKenzie | 521/905 |
| 4,058,124 | 11/1977 | Yen et al. | 47/9 |
| 5,226,255 | 7/1993 | Robertson | 47/56 |
| 5,456,733 | 10/1995 | Hamilton, Jr. | 47/9 |

*Primary Examiner*—Michael Marcheschi
*Attorney, Agent, or Firm*—Brian M. Dingman

[57] ABSTRACT

A mechanically-bonded, water-absorbent fiber mulch including natural and crimped synthetic fibers that are intimately mixed to form a mechanically-bonded fiber mulch. A water-absorbent polymer-based material is dispersed throughout the fiber mulch to increase its water absorption capacity.

10 Claims, 1 Drawing Sheet

MECHANICALLY BONDED FIBER MULCH AND PROCESS FOR PRODUCING SAME

FIELD OF INVENTION

This invention relates to a fiber mulch for application to seed beds, and the process for producing such mulch.

BACKGROUND OF INVENTION

Various types of mulches are commonly applied over grass seed beds. The purpose of these mulches is to increase grass seed germination and decrease soil erosion to allow the seedlings to become firmly established in the seeded area. These mulches typically consist of natural materials such as straw, wood shavings, or paper. The mulches are mixed with water and agitated in a holding tank, and then sprayed onto the seed bed. Some such mulches are woven into blankets that are designed to be laid down over seed beds.

Such mulches are somewhat effective. They do absorb and retain some water, thus keeping the seed bed more hydrated then when mulch is not used. They additionally deflect some of the rain, thereby decreasing to some extent soil erosion. However, most such mulches are loose configurations of unbonded fibers that easily wash away. The paper-based mulches tend to bond into a paper mache-like mat that inhibits oxygen and sunlight transfer, and the ability of seedlings to emerge through the mulch, thus affecting the vegetation establishment.

There have also been introduced into the market chemically bonded natural fiber spray-applied mulches. These mulches use a vegetable gum binder such as guar gum to bind together natural fibers. Although this mulch is extremely well bonded, it has not been successful for a number of reasons. The chemically-bonded mulch forms an almost impenetrable layer over the seed bed that is poor at passing the needed oxygen and water through to the seed bed, and is also very difficult for the germinated seedlings to penetrate. Accordingly, the results for this product have been poor.

SUMMARY OF THE INVENTION

It is therefore an object of this invention to provide a seed bed mulch that increases seed germination rates.

It is a further object of this invention to provide such a mulch that establishes more seedlings.

It is a further object of this invention to provide such a mulch that increases the amount of vegetation per acre in newly seeded beds.

It is a further object of this invention to provide such a mulch that reduces soil erosion, even on steeply-sloped surfaces.

It is a further object of this invention to provide such a mulch which increases water absorption into the seed bed.

It is a further object of this invention to provide such a mulch that reduces water run off from the mulched seed bed.

It is a further object of this invention to provide such a mulch that reduces the amount of expensive seed that is washed off of the seed bed.

It is a further object of this invention to provide such a mulch which increases the stress tolerance of the seedlings.

It is a further object of this invention to provide such a mulch that increases the oxygen transfer to the seed bed.

It is a further object of this invention to provide such a mulch which results in faster seed germination.

It is a further object of this invention to provide such a mulch that provides erosion control for an extended period of time.

This invention results from the realization that an effective fiber mulch that may be spray-applied to seed beds may be accomplished with an intimate mixture of primarily natural fibers such as wood fibers with a small percentage of crimped synthetic fibers that act to bind the wood fibers together in an open but strong matrix, with a small percentage of a polymer-based water absorbent material dispersed throughout the mechanically-bonded fiber mulch to increase the water absorption capability of the mulch and maintain the seeds and seedlings hydrated.

This invention features a mechanically-bonded, water-absorbent fiber mulch, and a process for making such a fiber mulch. The mulch includes natural fibers and synthetic fibers that are intimately mixed to form a mechanically-bonded fiber mulch in which the synthetic fibers hold together the natural fibers. A polymer-based water absorbent is dispersed throughout the fiber mulch to increase the mulch water absorption capacity.

The natural fibers may comprise about 65% to 95% (by weight) of the mulch, and preferably comprise about 90% of the mulch. Wood fibers are the preferred natural fibers, although other natural fibers such as jute and many other types of available natural fibers may be used.

The synthetic fibers preferably comprise about 5% to 15% (by weight) of a mulch, and more preferably approximately 5%. The preferred fibers are relatively short (about ½" long) crimped polyester fibers that interlock to one another and to the wood fibers to create an open, yet mechanically bonded, fiber matrix that remains in place even on steep slopes, yet is open enough to allow water and oxygen to pass through into the seed bed, and allow the seedlings to grow up through the matrix.

The polymer-based water absorbent is preferably present at about 5% to 15% of the mulch weight. The water absorbent is preferably a powder such as a polyacrylamide-based copolymer powder that absorbs many times its own weight in water.

The fiber mulch thus prevents erosion both because of the mechanical properties of the mulch as well as its water-absorbent properties. The water absorbency provides a longer lasting, more even hydration of the seed and seedlings to maximize germination and plant growth. The matrix is sufficiently open to allow air to easily pass through to further foster plant growth. The synthetic fibers degrade more slowly than the natural fibers, thereby providing a longer-term erosion control medium, lasting perhaps up to one year.

This mulch is preferably produced by entraining the natural fibers in an air stream, and introducing into this air stream the synthetic fibers in a ratio of about 0.05-0.25 parts synthetic to natural fibers, to create an intimately mixed, mechanically-bonded fiber mulch. The polymer-based water absorbent is then dispersed into the fiber mulch to increase its water absorption capacity. The water absorbent is preferably mechanically dispersed into the mixed natural fiber-synthetic fiber mulch.

BRIEF DESCRIPTION OF THE DRAWINGS

Other objects, features and advantages will occur to those skilled in the art from the following description of the preferred embodiments, and the accompanying drawings, in which.

This invention may be accomplished with a mechanically-bonded, water-absorbent fiber mulch, preferably including approximately 90% by weight wood fibers, approximately 5% by weight crimped synthetic fibers, and approximately 5% by weight polymer-based water absorbent powder. This invention is not limited to the particular materials chosen, nor the particular preferred materials ratios. The fiber mulch is a mechanically-bonded open weave accomplished by reason of the synthetic fibers' entanglement with one another and with the wood fibers to hold the wood fiber together in a matrix which is sufficiently open to allow air to pass through, and seedlings to grow up through. A polymer-based water absorbent such as a polyacrylamide-based powder is dispersed throughout the matrix to increase the water-holding capacity of the mulch so that more water is provided to the seed bed, and water run-off is inhibited.

Figure 1:
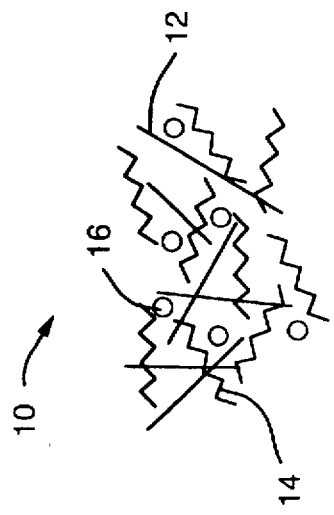
FIG. 1 is a simplified, enlarged, schematic diagram of a mechanically-bonded water-absorbent fiber mulch according to this invention.

The mulch of this invention is depicted very schematically in FIG. 1, in which natural fibers 12 are intimately mixed with synthetic fibers 14 to form a mechanically-bonded fiber mulch. Water absorbent 16 is dispersed throughout the fiber mulch to increase the mulch water absorption capacity.

Natural fibers 12 are preferably wood fibers of about one-eighth to three-quarters inch in length. Wood fibers provide a quality natural mulch. However, such natural fibers do not bond together well. Thus, when they are used alone in a mulch, the mulch is easily disturbed on the surface, allowing heavy rains to wash the mulch, seed, and soil from sloped surfaces, thus greatly decreasing the effectiveness of the mulch. To overcome such problems, the wood fibers in this invention are intimately mixed with a relatively small amount of synthetic fibers 14, which are preferably crimped polyester fibers about ½" in length and 4.75 Denier. Such fibers are available commercially as 33628A Type N91 4.75×0.5 SDOW from the Hoechst-Celanese Corporation, Spartanburg, S.C. The crimped synthetic fibers hold onto one another and to the wood fibers fairly tenaciously. It has been found that the ratio of such synthetic fibers to the natural fibers should be in the range of 0.05-0.25 parts by weight synthetic to natural fibers to create a mechanically-bonded fiber mulch that can be spray applied to seed beds. Too much of the crimped fiber causes too much entanglement, which makes the product difficult to keep uniformly mixed in the spray applicator, and thus difficult to uniformly apply. Too little synthetic fiber does not sufficiently bond together the natural fibers to create the results obtained by the mulch of the present invention.

The polymer-based water absorbent 16 is preferably a powder that is mixed with the bonded fiber matrix, preferably by mechanical mixing. A preferred water absorbent polymer material is "Tacking Agent III" available from Spittle Enterprises, Inc., of Huntersville, N.C. Tacking Agent III is a copolymer of polyacrylamide that absorbs five to ten times its own weight in water. The absorbent thus increases the water-absorption capability of the mulched seed bed, thus providing better hydration to the seed and seedlings, which leads to quicker germination, more complete germination, and more plant mass per acre. A surfactant may be added as well to increase the water absorption of the wood fiber.

Figure 2:
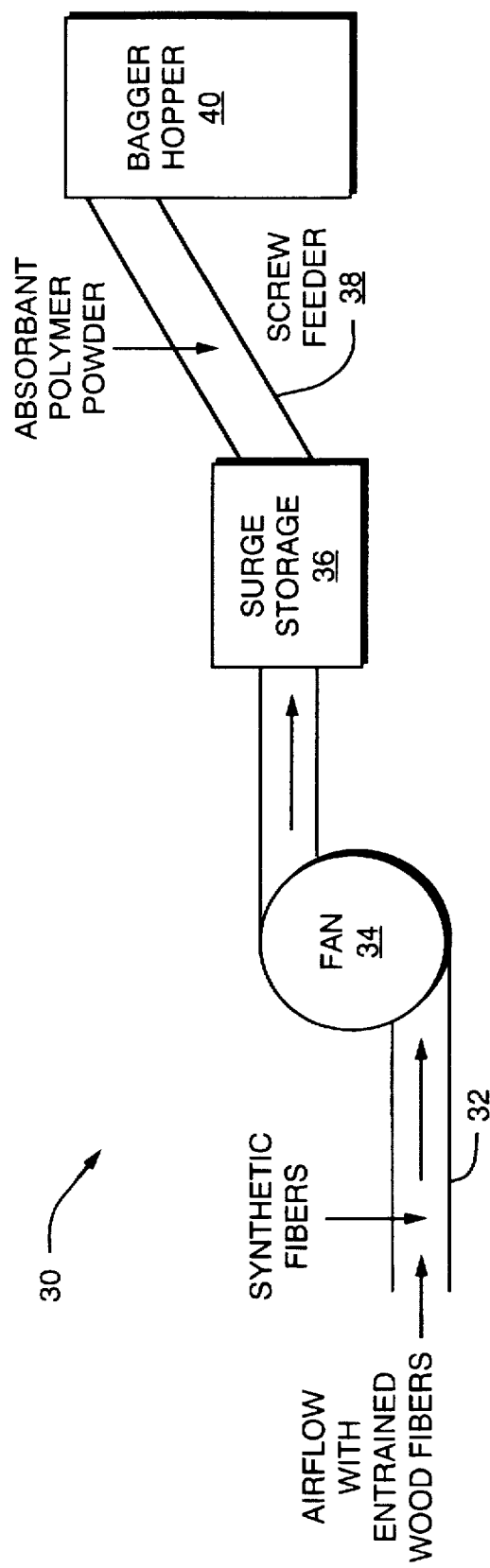
FIG. 2 is a schematic diagram of a preferred process for producing the mulch of this invention.

A preferred process for producing the fiber mulch of this invention is depicted schematically in FIG. 2 as process 30. Wood fibers are entrained in an air flow within conduit 32. The proper amount of synthetic fiber is added to this entrained flow within conduit 32 upstream of fan 34. The materials mix together in conduit 32, and pass through fan 34 and into surge storage container 36. The turbulence created in the air flow and by the fan intimately mixes the wood and polyester fibers to create a mechanically-bonded fiber mulch. The Tacking Agent III powder is metered into this mixed mulch in screw feeder 38 which moves the mulch from storage 36 to bagger hopper 40. It has been found that this mechanical dispersion of the absorbent polymer powder is preferable to dispersion in the air stream, as the powder can be easily blown out of the matrix and lost, or unevenly dispersed in the matrix, as a result.

The mulch of this invention is preferably applied to areas being vegetated as follows. The mulch product, which is packed and shipped in bails, is added to the mixing tank of a standard hydro-seeding machine that uses mechanical or jet agitation. The fertilizer, seed and soil amendments can also be added if desired. Preferably, however, the seed bed is first prepared by mixing the seed, fertilizer, soil amendments, and a relatively small amount of the mulch of this invention and applying that to the seed bed. Then, one or two layers of the mulch in water are sprayed on top of the seed bed to form the protective, water-absorbent mulch matrix layer over the seed bed.

It has been found that the mulch of this invention is preferably applied at a rate of about 3000 pounds per acre for new turf beds. The mulch can also be used with other vegetative beds, such as crops.

Most preferably, the seed, fertilizer, soil amendments and 600 pounds of the mulch of this invention are mixed and spray applied to an acre of soil. When possible, a cultipacker or lawn roller is then run over the soil to improve the seed-to-soil contact.

A layer of the mulch of this invention is then spray applied over the prepared seed bed, preferably covering at least 95% of the seed bed. This can be accomplished by mixing 1200 pounds of the mulch of this invention in 3000 gallons of water and spray applying that to the one acre seed bed. A second application of the mulch at the same rate, when possible from the opposite direction of the first application, is then sprayed on in order to increase the soil coverage, and thus the mulch effectiveness.

The mulch of this invention, when applied in this manner, has been found to decrease soil erosion from sloped surfaces by up to 30 times, and to reduce water runoff by up to 5 times, as compared to straw blanket and excelsior blanket mulch products. The mass of plants per acre grown under such conditions as compared to the other two mulches has been shown to be more than 50% greater, with much greater seedling germination rates as well.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. An open, yet mechanically-bonded, water-absorbent fiber matrix mulch which can be mixed with water and spray applied to soil to form an open, mechanically bonded mulch on the surface of the soil to which it is applied, comprising:

about 65% to 95% wood fibers having a length of about ⅛ to ¾ inch;

about 5% to 15% synthetic fibers; and about 5% to 15% polymer-based water absorbent;

wherein said wood fibers and said synthetic fibers are intimately mixed and interlocked with one another to form an open, yet mechanically-bonded fiber matrix mulch, and said water absorbent is dispersed throughout said fiber matrix mulch to increase the mulch water absorption capacity.

2. The mechanically-bonded, water absorbent fiber mulch of claim 1 in which said synthetic fibers include crimped fibers.

3. The mechanically-bonded, water absorbent fiber mulch of claim 1 in which said synthetic fibers include crimped polyester fibers.

4. The mechanically-bonded, water absorbent fiber mulch of claim 1 in which said synthetic fibers are approximately ½" long.

5. The mechanically-bonded, water absorbent fiber mulch of claim 1 in which said polymer based water absorbent includes polyacrylamide.

6. The mechanically-bonded, water absorbent fiber mulch of claim 1 in which said polymer-based water absorbent is a powder.

7. The mechanically-bonded, water absorbent fiber mulch of claim 1 in which the fiber mulch includes about 90% wood fibers.

8. The mechanically-bonded, water absorbent fiber mulch of claim 7 in which the fiber mulch includes about 5% crimped synthetic fibers.

9. The mechanically-bonded, water absorbent fiber mulch of claim 8 in which the fiber mulch includes about 5% polymer-based water absorbent.

10. An open, yet mechanically-bonded, water-absorbent fiber matrix mulch which can be mixed with water and spray applied to soil to form an open, mechanically bonded mulch on the surface of the soil to which it is applied, comprising:

about 90% wood fibers having a length of about ⅛ to ¾ inch;

about 5% crimped synthetic fibers; and about 5% polymer-based water absorbent;

wherein said wood fibers and said synthetic fibers are intimately mixed and interlocked with one another to form an open, yet mechanically-bonded fiber matrix mulch, and said water absorbent is dispersed throughout said fiber matrix mulch to increase the mulch water absorption capacity.

\* \* \* \* \*